(12) United States Patent  (10) Patent No.: US 8,233,222 B2
Lee  (45) Date of Patent: Jul. 31, 2012

(54) ZOOM LENS SYSTEM

(75) Inventor: Seon-ho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 12/952,414

(22) Filed: Nov. 23, 2010

(65) Prior Publication Data
US 2011/0134542 A1 Jun. 9, 2011

(30) Foreign Application Priority Data

Dec. 3, 2009 (KR) .................. 10-2009-0119101

(51) Int. Cl.
*G02B 15/02* (2006.01)
*G02B 15/14* (2006.01)
(52) U.S. Cl. ............... 359/674; 359/672; 359/676
(58) Field of Classification Search .......... 359/672, 359/673, 674, 675, 676
See application file for complete search history.

(56) References Cited

U.S. PATENT DOCUMENTS

| | | | | |
|---|---|---|---|---|
| 4,214,829 A | * | 7/1980 | Ohashi | 396/73 |
| 4,469,396 A | * | 9/1984 | Neil | 359/353 |
| 5,765,049 A | * | 6/1998 | Hase et al. | 396/73 |
| 7,209,294 B2 | * | 4/2007 | Takahashi | 359/672 |
| 7,477,454 B2 | * | 1/2009 | Shinohara et al. | 359/676 |
| 7,495,852 B2 | * | 2/2009 | Gutierrez | 359/821 |
| 7,889,435 B2 | * | 2/2011 | Seo | 359/672 |

FOREIGN PATENT DOCUMENTS

| | | |
|---|---|---|
| KR | 1020030069867 A | 8/2003 |
| KR | 1020070043020 A | 4/2007 |

* cited by examiner

*Primary Examiner* — David N Spector
(74) *Attorney, Agent, or Firm* — Drinker Biddle & Reath LLP

(57) ABSTRACT

A zoom lens system including at least one lens group that is positioned to be movable along an optical axis of image light for photographing; and a movable frame including a plurality of selection lens groups, the movable frame being movable between a photographing position and a storage position, wherein the photographing position is a position in which one of the selection lens groups is selectively positioned on the optical axis, and the storage position is a position in which all of the selection lens groups are outside the optical axis, and the movable frame including a storage portion that houses at least a portion of the at least one lens group when the movable frame is moved to the storage position.

11 Claims, 7 Drawing Sheets

ZOOM LENS SYSTEM

CROSS-REFERENCE TO RELATED PATENT APPLICATION

This application claims the priority benefit of Korean Patent Application No. 10-2009-0119101, filed on Dec. 3, 2009, in the Korean Intellectual Property Office, the disclosure of which is incorporated herein in its entirety by reference.

BACKGROUND

1. Field of the Invention

Embodiments relate to a zoom lens system, and in particular, to a zoom lens system having a lens storage space for reducing the thickness of the zoom lens system and for selecting a lens group having a different performance according to purpose of use.

2. Description of the Related Art

Zoom lens systems form an image by passing image light through various optical elements and are widely used in photographing apparatuses such as digital cameras or video cameras. In addition, use of a charge coupled device (CCD) or a complementary metal oxide semiconductor (CMOS) enables manufacturing of small and thin photographing apparatuses. However, in order to manufacture thinner photographing apparatuses, components of the photographing apparatuses should have a small thickness.

A conventional zoom lens system may be a retractable zoom lens system or a folded-optics zoom lens system. According to the retractable zoom lens system, in order to manufacture slim photographing apparatuses, lenses protrude during photographing and retract into a body of a camera when not in use. According to the folded-optics zoom lens system, the thickness of a lens system is reduced by using a reflective element such as a prism to fold the optical path of the zoom lens system.

With regards to the retractable zoom lens system, a plurality of lens groups are aligned and movable along an optical axis, and when the zoom lens system is not in use, the lens groups retract into a body of a camera. In order to minimize the thickness of the zoom lens system, the lens groups are aligned with as little space as possible therebetween when the lens groups retract into the body of the camera.

However, the retractable zoom lens system has a structural limitation in that even when lens groups retract into a body of a camera, the thickness of the zoom lens system is not smaller than the sum of thicknesses of the lens groups.

Zoom lens systems have various optical characteristics according to the lens groups used. A user selects a zoom lens system according to purpose of use of a photographing apparatus. For example, if a user takes a landscape picture, the user selects a wide angle zoom lens system having an excellent wide-angle performance and a wide viewing angle, and if a user takes a picture of a distant subject, the user selects a tele-angle zoom lens system including lens groups having a narrow viewing angle and a long focal length. Thus, since the user needs to buy various zoom lens systems according to a photographing purpose, the photographing costs are increased and exchanging with a desired zoom lens system during photographing is inconvenient.

SUMMARY

Embodiments include a zoom lens system that minimizes a lens storage space.

Embodiments also include a zoom lens system that embodies various optical performances using the one zoom lens system.

Embodiments also include a zoom lens system in which a user selects at least one lens group from a plurality of lens groups according to a photographing purpose without exchanging the zoom lens system.

Embodiments also include a zoom lens system in which a storage space for lens groups is obtained by placing a plurality of lens groups outside an optical axis when the lens groups retract.

According to an embodiment, a zoom lens system facilitates the selection of a variety of lens groups and provides an extended optical performance by including a movable frame that includes a plurality of selection lens groups. The movable frame may be moved between a photographing position and a storage position, wherein the photographing position is a position in which one of the selection lens groups is selectively positioned on the optical axis, and the storage position is a position in which all of the selection lens groups are outside the optical axis.

The zoom lens system includes: at least one lens group that is movable along an optical axis; and a movable frame including a plurality of selection lens groups, the movable frame being movable between a photographing position and a storage position, wherein the photographing position is a position in which one of the selection lens groups is selectively positioned on the optical axis, and the storage position is a position in which all of the selection lens groups are outside the optical axis. The movable frame further includes a storage portion that houses at least a portion of the at least one lens group when the movable frame is moved to the storage position.

The movable frame may be rotatable, and the selection lens groups and the storage space may be positioned on a common circle centered on a rotation center of the movable frame.

The movable frame may rotate with respect to a shaft that is parallel to the optical axis.

The movable frame may be movable along a straight line, and the selection lens groups and the storage portion may be positioned along the straight line along which the movable frame moves.

The selection lens groups may include a first selection lens group having a wide-angle function and a second selection lens group having a high magnification zoom function.

The at least one lens group may include a first lens group and a second lens group positioned in front of the movable frame and a third lens group positioned behind the movable frame, all aligned along the optical axis.

The movable frame may be movable along the optical axis.

The selection lens groups may include a first selection lens group and a second selection lens group, wherein the first and second selection lens groups have different focal distances.

According to another embodiment, a zoom lens system includes: a plurality of lens groups that are movable along an optical axis; and a plurality of selection lens groups that are selectively positioned on the optical axis, wherein one of the selection lens groups is selectively positioned on the optical axis to select any one of a plurality of optical systems, and when the plurality of lens groups are moved to be close to each other along the optical axis for storage, all of the selection lens groups are positioned outside the optical axis to secure a storage portion for the plurality of lens groups.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, the structure and operation of various embodiments of a zoom lens system will be described in with reference to the attached drawings.

Figure 1:
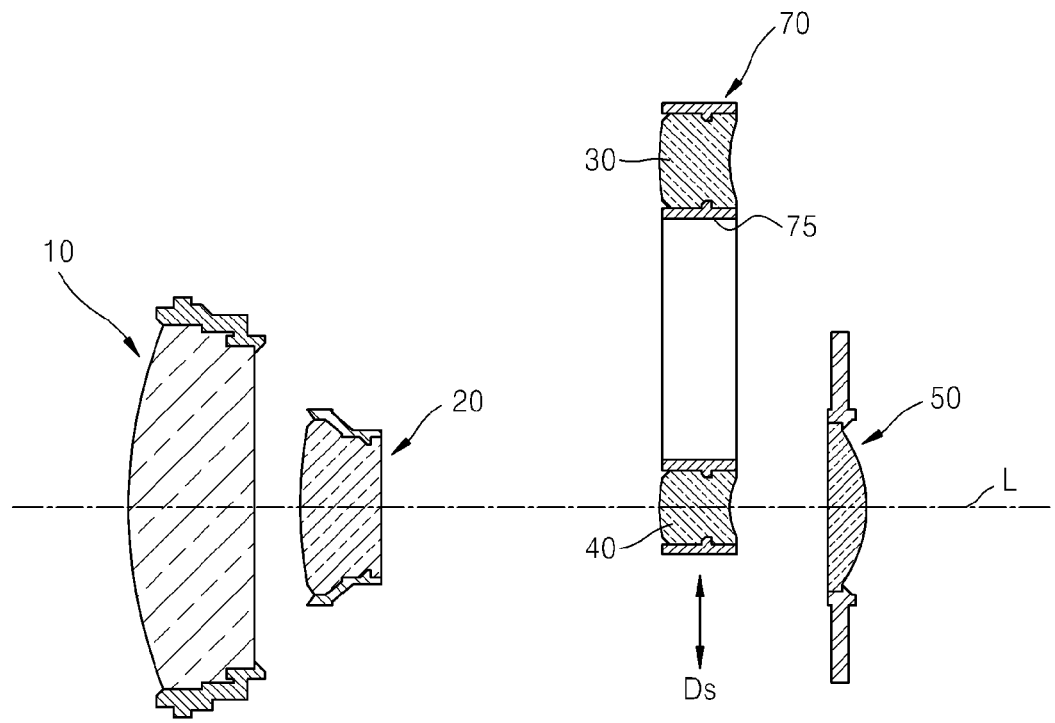
FIG. 1 is a cross-sectional view of lens groups of a zoom lens system aligned in an operation state, according to an embodiment.

FIG. 1 is a cross-sectional view of lens groups of a zoom lens system aligned in an operation state, according to an embodiment.

Referring to FIG. 1, the zoom lens system according to the present embodiment includes first, second, and fifth lens groups 10, 20, and 50 which are aligned and movable along an optical axis L, a plurality of selection lens groups 30 and 40, a movable frame 70 that is movable in a direction perpendicular to the optical axis L, and a storage portion 75 included in the movable frame 70. In the zoom lens system of FIG. 1, other components for supporting the first, second, and fifth lens groups 10, 20, and 50 are not illustrated in order to more clearly explain relative motions and position relationships between the first, second, and fifth lens groups 10, 20, and 50 and the movable frame 70.

The first, second, and fifth lens groups 10, 20, and 50 are aligned and may be movable along the optical axis L. The first lens group 10 is disposed as a frontmost lens group with respect to image light and thus image light enters the first lens group 10 first, and then the second lens group 20 and the fifth lens group 50 are sequentially disposed behind the first lens group 10 along the optical axis L.

The first, second, and fifth lens groups 10, 20, and 50 may be movable along the optical axis L, and distances among the first, second, and fifth lens groups 10, 20, and 50 may be adjusted to control a zoom function and a focal distance. In FIG. 1, the first, second, and fifth lens groups 10, 20, and 50 and the movable frame 70 are moved toward a front side of the zoom lens system along the optical axis L to take a picture.

The movable frame 70 may be movable along a direction Ds that crosses the optical axis L. The movable frame 70 may include the selection lens groups 30 and 40, and is movable in a range from a photographing position in which any one of the selection lens groups 30 and 40 is selected and positioned on the optical axis L, to a storage position in which all the selection lens groups 30 and 40 are positioned outside the optical axis L.

Figure 2:
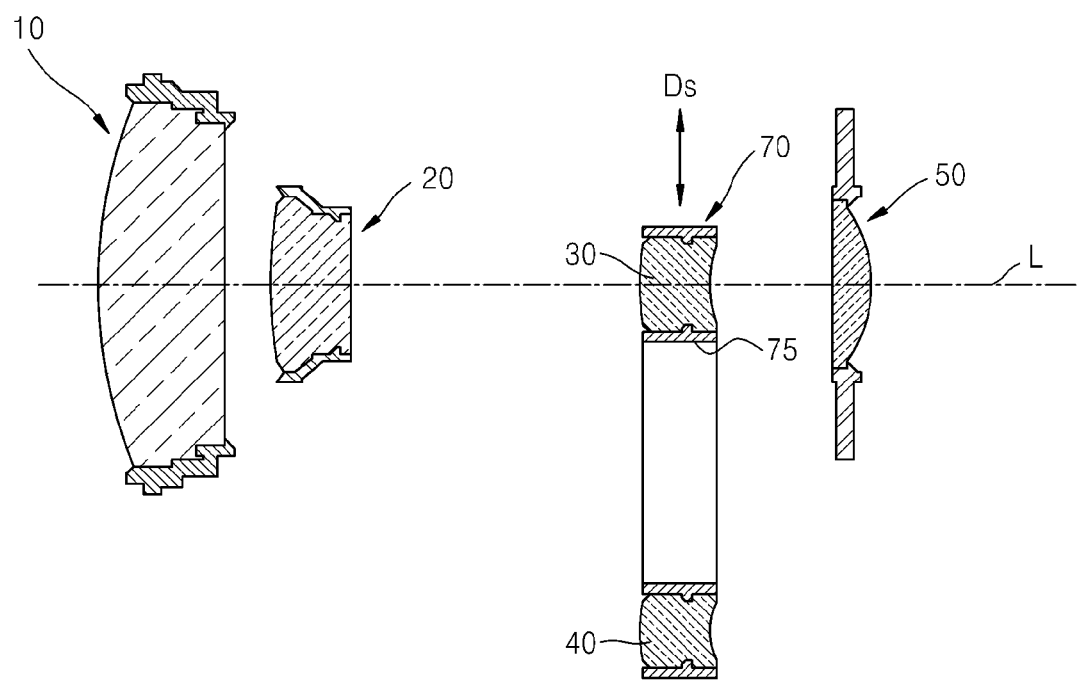
FIG. 2 is a cross-sectional view illustrating another operation state of the zoom lens system of FIG. 1, according to an embodiment.

FIG. 2 is a cross-sectional view illustrating another operation state of the zoom lens system of FIG. 1, according to an embodiment.

The movable frame 70 may be moved upward along the direction Ds, which crosses the optical axis L, to position the selection lens group 40 on the optical axis L. That is, the movable frame 70 may be positioned in a first photographing position, as illustrated in FIG. 1. The movable frame 70 may also be moved downward along the direction Ds to position the selection lens group 30 on the optical axis L. That is, the movable frame 70 may be positioned in a second photographing position, as illustrated in FIG. 2. During photographing, the movable frame 70 may be positioned in the first photographing position or the second photographing position, according to user selection.

As described above, in the zoom lens system according to the present embodiment, any one of the selection lens groups 30 and 40 may be selected and positioned on the optical axis L and thus one of a plurality of optical systems may be selected. That is, when the third lens group 30 is positioned on the optical axis L, the first, second, and fifth lens groups 10, 20, and 50 and the third lens group 30 may form a first optical system. In addition, when the fourth lens group 40 is positioned on the optical axis L, the first, second, and fifth lens groups 10, 20, and 50 and the fourth lens group 40 may form a second optical system.

The selection lens groups 30 and 40 may include the third lens group 30 and the fourth lens group 40. Although according to the present embodiment, the selection lens groups 30 and 40 include two lens groups, the invention is not limited thereto. For example, the selection lens groups may include three or four lens groups.

The third lens group 30 and the fourth lens group 40 may have different optical characteristics. The third lens group 30 may be a wide-angle lens group that realizes a super wide-angle mode of the zoom lens system, and the fourth lens group 40 may be a general zoom lens group that performs a general zoom function. However, the optical characteristics of the third lens group 30 and the fourth lens group 40 are not limited thereto, and lens groups having different optical characteristics may also be used as the third lens group 30 and the fourth lens group 40. For example, the third lens group 30 may be a high magnification zoom lens group that realizes a high magnification zoom function.

Figure 3:
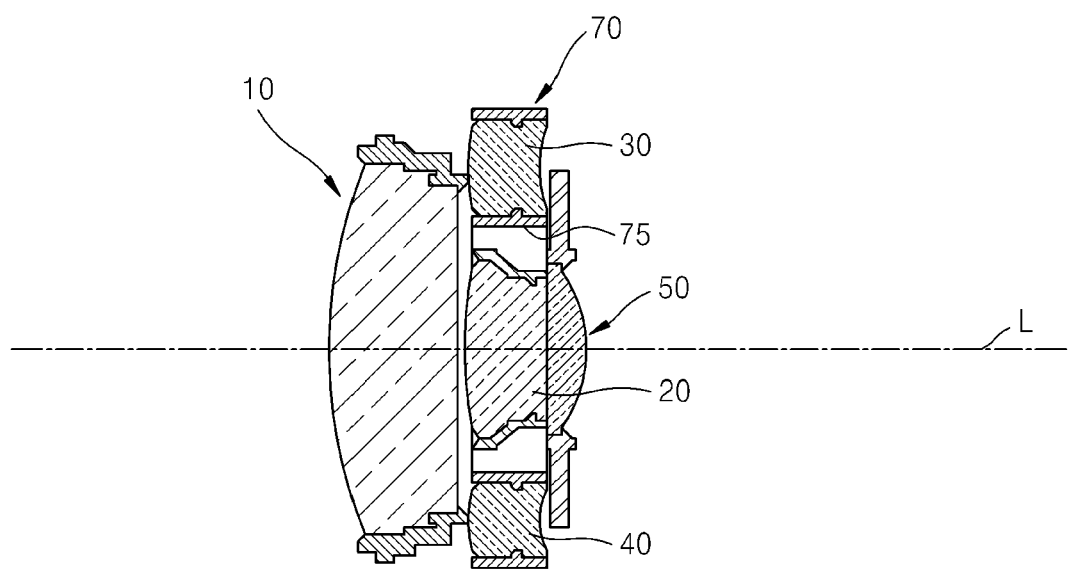
FIG. 3 is a cross-sectional view of the zoom lens system of FIGS. 1 and 2 when the lens groups of the zoom lens system retract, according to an embodiment.

FIG. 3 is a cross-sectional view of the zoom lens system of FIGS. 1 and 2 when the first, second, and fifth lens groups 10, 20, and 50 of the zoom lens system retract, according to an embodiment.

The movable frame 70 may be moved to the storage position, in which the selection lens groups 30 and 40 are positioned outside the optical axis L, as illustrated in FIG. 3. The storage position refers to a position of the zoom lens system when the zoom lens system is not in use. When the movable frame 70 is positioned in the storage position, lens barrels of the zoom lens system are collapsed.

The movable frame 70 may include the storage portion 75 that houses at least a portion of the first, second, and fifth lens groups 10, 20, and 50 when the zoom lens system is in the storage position. According to the present embodiment, the storage portion 75 houses the second lens group 20.

When the first, second, and fifth lens groups 10, 20, and 50 of the zoom lens system retract, the movable frame 70 is moved to the storage position and the first lens group 10 and the second lens group 20, which are positioned in front of the movable frame 70, and the fifth lens group 50 are moved toward the movable frame 70 along the optical axis L so that spaces between the movable frame 70 and the first, second, and fifth lens groups 10, 20, and 50 are minimized. The movements of the movable frame 70 and the first, second, and fifth lens groups 10, 20, and 50 may occur simultaneously. In this regard, an interval between the first lens group 10 and the second lens group 20 is minimized and the second lens group 20 enters the storage portion 75 of the movable frame 70. Accordingly, when the first, second, and fifth lens groups 10, 20, and 50 of the zoom lens system retract, the thickness of the zoom lens system may be reduced by an amount corresponding to the thickness of the second lens group 20. As described above, when the first, second, and fifth lens groups 10, 20, and 50 retract, all the selection lens groups 30 and 40 are outside the optical axis L and thus a storage space for at least one of the first, second, and fifth lens groups 10, 20, and 50 may be secured.

Figure 4:
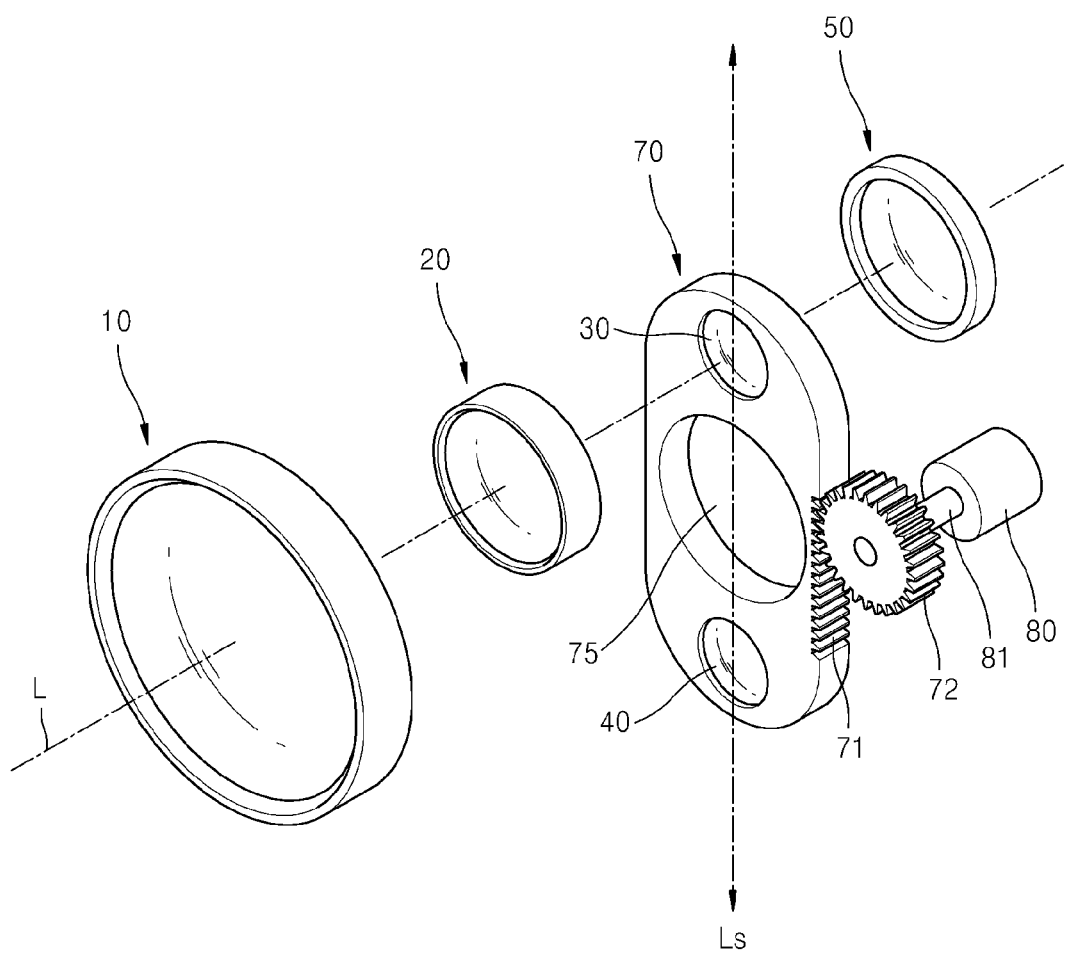
FIG. 4 is a schematic perspective view illustrating components of the zoom lens system of FIGS. 1, 2, and 3, according to an embodiment.

FIG. 4 is a schematic perspective view illustrating components of the zoom lens system of FIGS. 1, 2, and 3, according to an embodiment.

The movable frame 70 is aligned and movable along a straight line Ls that crosses the optical axis L. The selection lens groups 30 and 40 are aligned along the straight line Ls along which the movable frame 70 may be moved, and the storage portion 75 of the movable frame 70 is also aligned along the straight line Ls.

In the present embodiment illustrated in FIG. 4, a driving unit that drives the movable frame 70 along the straight line Ls may include a motor 80, a driving gear 72 coupled to a shaft 81 of the motor 80, and a rack gear surface 71 that is formed at an outer surface of the movable frame 70 and that is engaged with the driving gear 72. When the motor 80 operates, a rotary motion of the driving gear 72 is transferred to the rack gear surface 71 and thus the movable frame 70 may move upward or downward along the straight line Ls.

Figure 5:
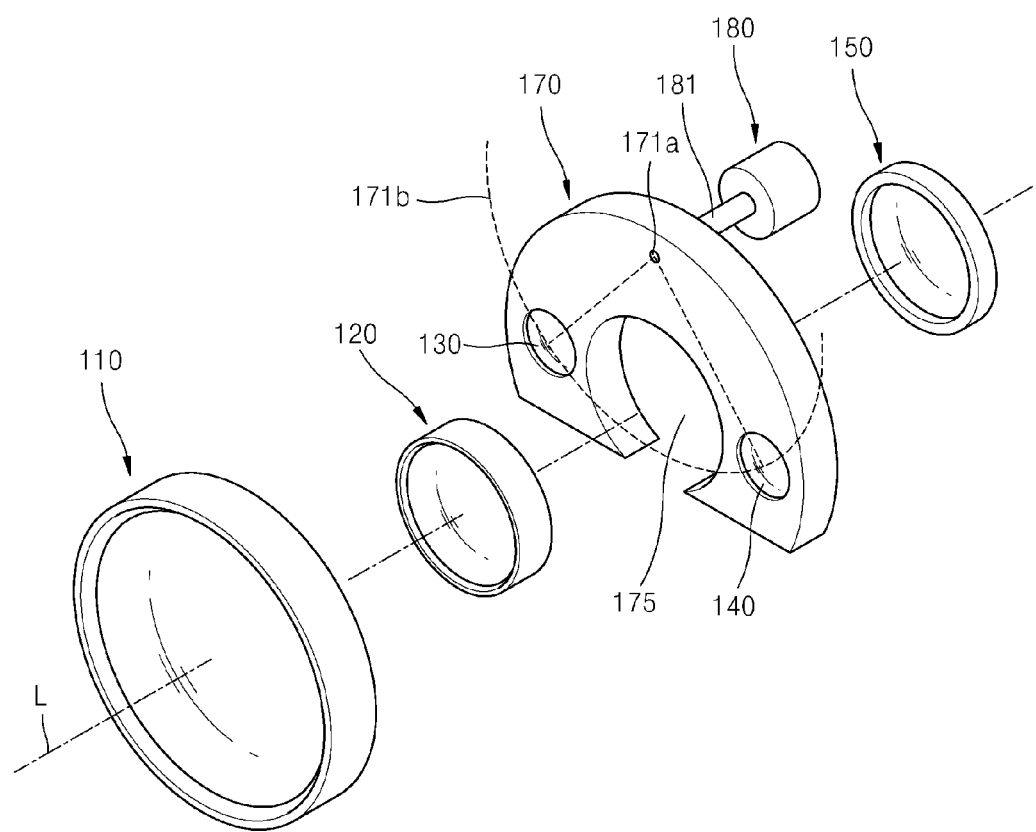
FIG. 5 is a schematic perspective view illustrating components of a zoom lens system, according to another embodiment.

FIG. 5 is a schematic perspective view illustrating components of a zoom lens system, according to another embodiment.

Referring to FIG. 5, the zoom lens system according to the present embodiment includes first, second, and fifth lens groups 110, 120, and 150 aligned along an optical axis L, a plurality of selection lens groups 130 and 140, a movable frame 170 that is rotatable in directions that cross the optical axis L, and a storage space 175 included in the movable frame 170. In the zoom lens system of FIG. 5, other components for supporting first, second, and fifth lens groups 110, 120, and 150 are not illustrated in order to more clearly explain relative motions and position relationships among the first, second, and fifth lens groups 110, 120, and 150 and the movable frame 170.

The first, second, and fifth lens groups 110, 120, and 150 are aligned and may be movable along the optical axis L. The first lens group 110 is disposed as a frontmost lens group with respect to image light and thus image light enters the first lens group 110 first, and then the second lens group 120 and the fifth lens group 150 are sequentially disposed behind the first lens group 110 along the optical axis L.

The first, second, and fifth lens groups 110, 120, and 150 may be movable along the optical axis L, and distances among the first, second, and fifth lens groups 110, 120, and 150 may also be adjusted to control a zoom function and a focal distance. In FIG. 5, the first, second, and fifth lens groups 110, 120, and 150 and the movable frame 170 are moved toward a front side of the zoom lens system along the optical axis L to take a picture.

The movable frame 170 has a rotation center 171a that is connected to a shaft 181 of a motor 180 and that rotates with respect to the shaft 181, which is parallel to the optical axis L. Thus, the movable frame 170 may rotate in directions that cross the optical axis L.

The movable frame 170 may include the selection lens groups 130 and 140 and is movable in a range between a photographing position and a storage position. The photographing position is a position in which any one of the selection lens groups 130 and 140 may be selected and positioned on the optical axis L and the storage position is a position in which all of the selection lens groups 130 and 140 are positioned outside the optical axis L. That is, the movable frame 170 may rotate clockwise from the position illustrated in FIG. 5 to position the selection lens group 140 on the optical axis L, which may be referred to as a first photographing position. On the other hand, the movable frame 170 may rotate counterclockwise from the position illustrated in FIG. 5 to position the selection lens group 130 on the optical axis L, which may be referred to as a second photographing position.

The movable frame 170 may include the storage space 175 for housing the second lens group 120. The selection lens groups 130 and 140 may be positioned on a circle 171b centered on the rotation center 171a of the movable frame 170. The storage space 175 may also be positioned on the circle 171b. Thus, when the motor 180 operates, the movable frame 170 rotates and the third lens group 130 may be positioned on the optical axis L, that is, at the second photographing position, the fourth lens group 140 may be positioned on the optical axis L, that is, at the first photographing position, or the storage space 175 may be positioned on the optical axis L, that is, at the storage position.

However, the structure for rotating the movable frame 170 is not limited to that as illustrated in FIG. 5 and other structures may be used. For example, as illustrated in FIG. 4, a structure in which a gear surface is formed in the movable frame 170 and a driving gear coupled to the shaft 181 of the motor 180 is engaged with the gear surface may also be used.

As described above, in the zoom lens system according to the present embodiment, one of a plurality of optical systems may be selected by selecting any one of the selection lens groups 130 and 140 and positioning the selected lens group. That is, when the third lens group 130 is positioned on the optical axis L, the first, second, and fifth lens groups 110, 120, and 150 and the third lens group 130 may form a first optical system. On the other hand, when the fourth lens group 140 is positioned on the optical axis L, the first, second, and fifth lens groups 110, 120, and 150 and the fourth lens group 140 may form a second optical system.

Figure 6:
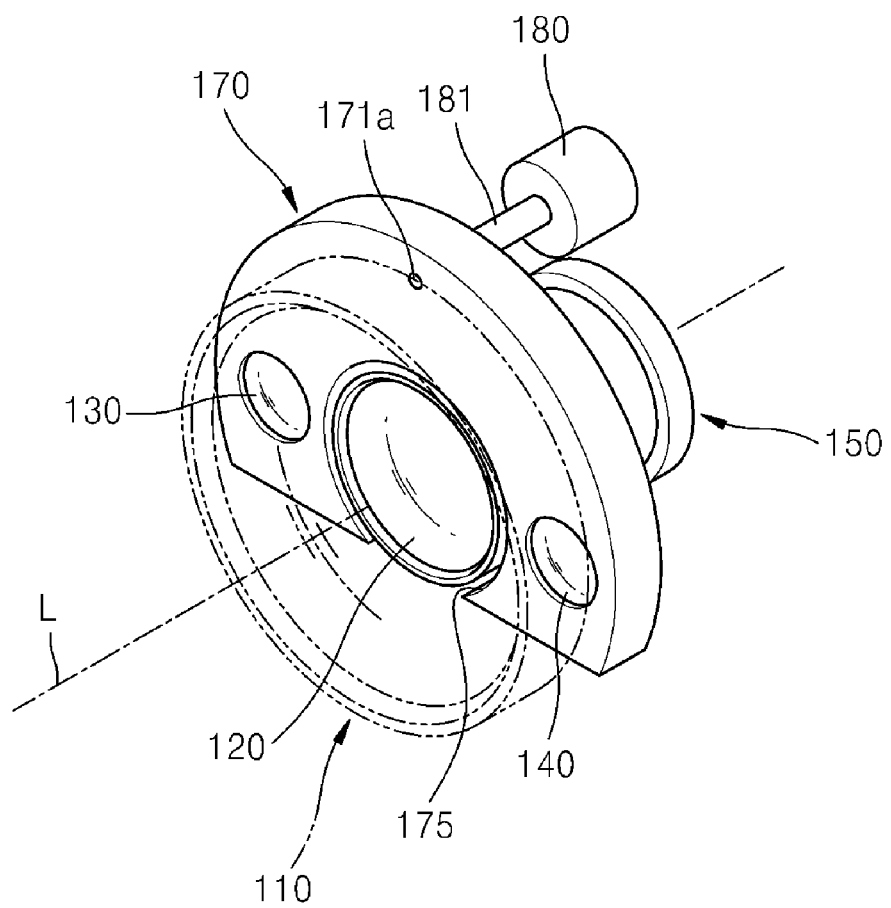
FIG. 6 is a schematic perspective view of the zoom lens system of FIG. 5 when lens groups of the zoom lens system retract, according to an embodiment.

FIG. 6 is a schematic perspective view of the zoom lens system of FIG. 5 when the first, second, and fifth lens groups 110, 120, and 150 of the zoom lens system retract, according to an embodiment.

The movable frame 170 may be rotated to be in the storage position as illustrated in FIG. 6, in which all of the selection lens groups 130 and 140 are positioned outside the optical axis L. The storage position refers to a position in which the zoom lens system is not in use and lens barrels of the zoom lens system are collapsed.

The movable frame 170 may include the storage space 175 that houses at least a portion of the first, second, and fifth lens groups 110, 120, and 150 when the zoom lens system is in the storage position. According to the present embodiment, the storage space 175 houses the second lens group 120.

When the first, second, and fifth lens groups 110, 120, and 150 of the zoom lens system retract, the movable frame 170 is moved to the storage position and the first lens group 110 and the second lens group 120, which are positioned in front of the movable frame 170, and the fifth lens group 150 move toward the movable frame 170. The movements of the movable frame 170 and the first, second, and fifth lens groups 110, 120, and 150 may occur simultaneously. An interval between the first lens group 110 and the second lens group 120 is minimized, and the second lens group 120 enters the storage space 175 of the movable frame 170. Thus, when the first, second, and fifth lens groups 110, 120, and 150 of the zoom lens system retract, the thickness of the zoom lens system may be reduced by an amount corresponding to the thickness of the second lens group 120.

Figure 7:
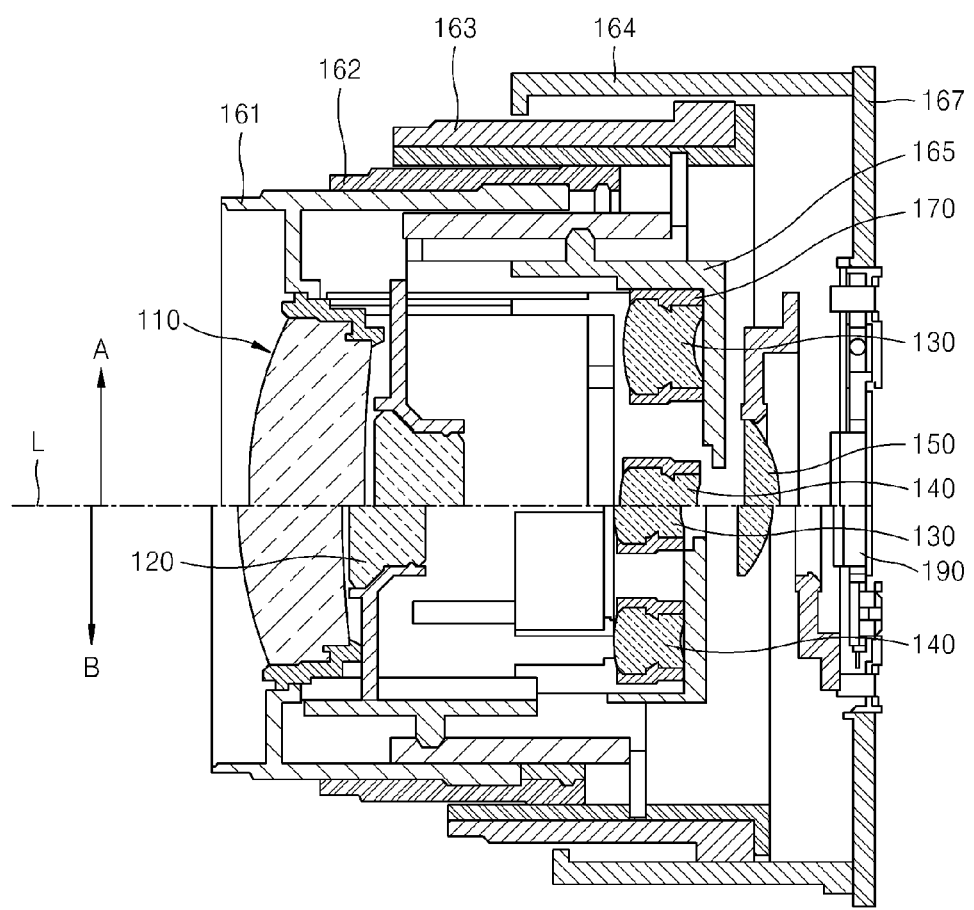
FIG. 7 is a cross-sectional view of lens groups of a zoom lens system and lens barrels for the lens groups, according to another embodiment.

FIG. 7 is a cross-sectional view of lens groups of a zoom lens system and lens barrels for the lens groups, according to another embodiment. The zoom lens system illustrated in FIG. 7 is the same as the zoom lens systems illustrated in FIGS. 5 and 6, except that in a storage position, only a portion of a second lens group 120 is stored in a storage space 175 of a movable frame 170.

A first lens group 110, the second lens group 120, the movable frame 170, a fifth lens group 150, and an imaging device 190 may be disposed along an optical axis L.

The imaging device 190 is positioned at a base 167, and a fixed lens barrel 164 is coupled to the base 167. A first lens barrel 161, a second lens barrel 162, and a third lens barrel 163 may be disposed in front of the fixed lens barrel 164 and may be movable forward or backward along the optical axis L.

The first, second, and third lens barrels 161, 162, and 163 support the first, second, and fifth lens groups 110, 120, and 150, respectively, and are moved forward or backward by using a driving unit such as a cam mechanism or a motor (not shown). Since an inner guide 165 that supports the movable frame 170 is also coupled to the first, second, and third lens barrels 161, 162, and 163, which may be moved by the cam mechanism, the movable frame 170 may be moved along the optical axis L forward or backward.

In FIG. 7, a top portion indicated by an arrow A represents a first photographing position in which a fourth lens group 140 is positioned on the optical axis L, and a bottom portion indicated by an arrow B represents a second photographing position in which a third lens group 130 is positioned on the optical axis L.

When a zoom lens system having the structure described above is used, photographing may be performed by selecting any one of the selection lens groups 130 and 140 having different optical characteristics according to a photographing purpose. Thus, various photographing modes may be realized without exchanging of the zoom lens system.

Figure 8:
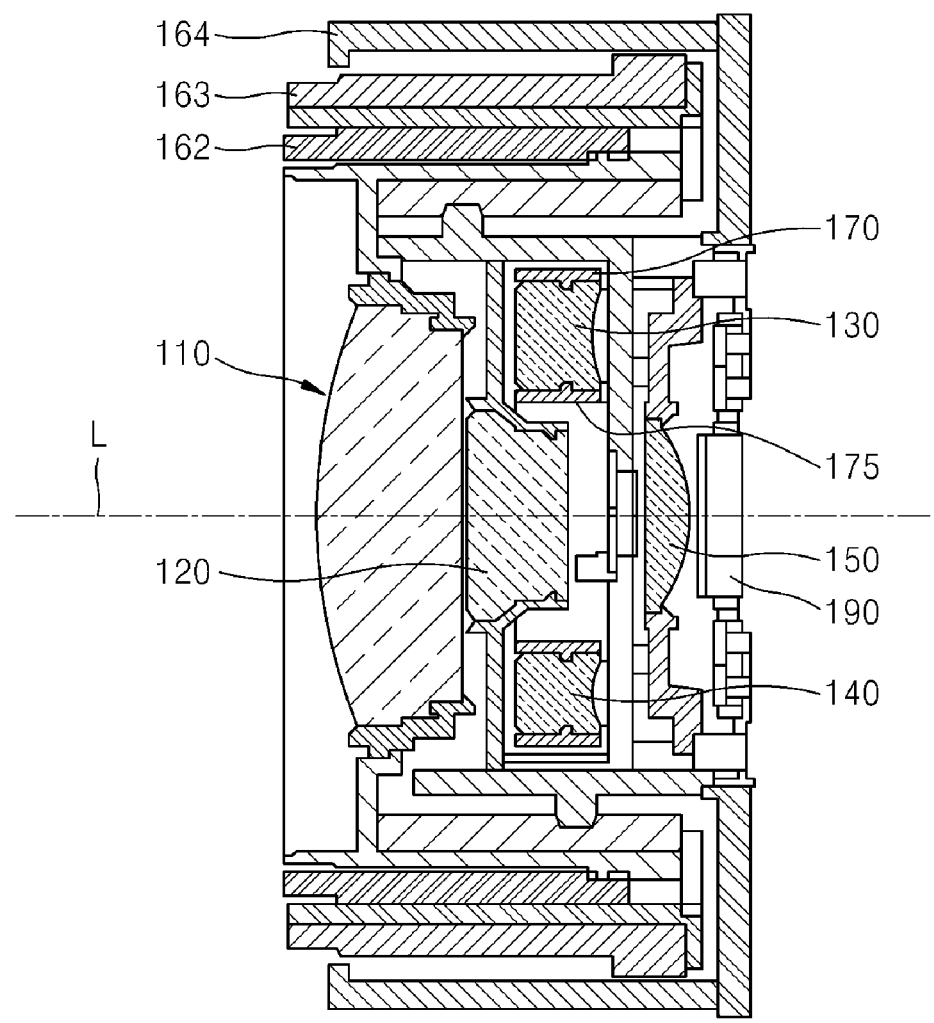
FIG. 8 is a cross-sectional view of the zoom lens system of FIG. 7 when the lens groups of the zoom lens system retract, according to an embodiment.

FIG. 8 is a cross-sectional view of the zoom lens system of FIG. 7 when the first, second, and fifth lens groups 110, 120, and 150 of the zoom lens system retract, according to an embodiment.

When the first, second, and fifth lens groups 110, 120, and 150 and the movable frame 170 of the zoom lens system are housed in the fixed lens barrel 164, the first, second, and third lens barrels 161, 162, and 163 supporting the first, second, and fifth lens groups 110, 120, and 150 are moved into the fixed lens barrel 164. In this regard, the movable frame 170 may be rotated to be in the storage position, in which the selection lens groups 130 and 140 are positioned outside the optical axis L and the storage space 175 is positioned on the optical axis L. When the zoom lens system is positioned in the storage position, the second lens group 120 is stored in the storage space 175.

When the first, second, and fifth lens groups 110, 120, and 150 of the zoom lens system retract, a portion of the second lens group 120 is housed in the storage space 175 of the movable frame 170. Thus, when the first, second, and fifth lens groups 110, 120, and 150 of the zoom lens system retract, the selection lens groups 130 and 140 are not on the optical axis L and thus a space for a portion of the first, second, and fifth lens groups 110, 120, and 150 is secured.

In the embodiments illustrated with reference to FIGS. 7 and 8, the zoom lens system is integrally coupled to an imaging device, that is, a camera mounting lens barrel assembly is illustrated. However, the invention is not limited to the structure described above. For example, the zoom lens system according to various embodiments may be coupled to a exchangeable lens camera. Thus, unlike the embodiments illustrated in FIGS. 7 and 8, the zoom lens system may also be embodied as a zoom lens assembly including only lens groups and a movable frame.

In the previous embodiments described above, the movable frame 170 is automatically moved by applying a control signal by using a driving unit, but the invention is not limited thereto. For example, the movable frame may be installed to be manually movable in a direction perpendicular to the optical axis L, so that a user may select any one of a plurality of selection lens groups according to a photographing purpose.

Zoom lens systems according to various embodiments may realize many various optical modes using only one lens assembly and thus may be used in various applications. For example, zoom lens systems according to various embodiments may be applied to compact electronic devices such as mobile phones to realize a camera function having two or more focal distances. Thus, more various functions may be realized compared to a conventional mobile phone including a camera having only one focal distance.

Also, although a conventional zoom lens system for cars may be used only for use in parking, if zoom lens systems according to the various embodiments are applied to cars, other functions, including supervising external circumstances for an anti-theft purpose, identifying a road condition during driving, and supervising for a safe driving purpose may also be realized.

Also, in cases in which zoom lens systems according to various embodiments are used in a surveillance camera of a closed-circuit television (CCTV), when a still image is taken using the surveillance camera, a viewing angle or a zoom region may be changed and thus the appliance range may be widened.

The zoom lens systems according to the above embodiments may have various optical characteristics using only one zoom lens system by selecting a portion of selection lens groups included in a movable frame since when the movable frame is rotated to be positioned in a photographing position, a portion of selection lens groups is selectively positioned on an optical axis. That is, without exchanging of the zoom lens system, one selection lens group satisfying a photographing purpose may be selected from a plurality of selection lens groups. A camera using the zoom lens systems may facilitate a user taking a picture more conveniently.

In addition, when lens groups of the zoom lens systems retract, the movable frame is rotated so that all the selection lens groups are positioned outside the optical axis and at least a portion of the lens groups is housed in a storage space of the movable frame. Thus, the thickness of a zoom lens system may be minimized when the lens groups retract.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A zoom lens system comprising:
    at least one lens group that is movable along an optical axis; and
    a movable frame comprising:
        a plurality of selection lens groups, the movable frame being movable between a photographing position and a storage position, wherein the photographing position is a position in which one of the selection lens groups is selectively positioned on the optical axis, and the storage position is a position in which all of the selection lens groups are outside the optical axis; and
        a storage portion that houses at least a portion of the at least one lens group when the movable frame is moved to the storage position.

2. The zoom lens system of claim 1, wherein the movable frame is movable along a straight line, and the selection lens groups and the storage portion are positioned along the straight line along which the movable frame moves.

3. The zoom lens system of claim 1, wherein the selection lens groups comprise a first selection lens group having a wide-angle function and a second selection lens group having a high magnification zoom function.

4. The zoom lens system of claim 1, wherein the at least one lens group comprises a first lens group and a second lens group positioned in front of the movable frame and a third lens group positioned behind the movable frame, all aligned along the optical axis.

5. The zoom lens system of claim 1, wherein the movable frame is movable along the optical axis.

6. The zoom lens system of claim 1, wherein the selection lens groups comprise a first selection lens group and a second selection lens group, wherein the first and second selection lens groups have different focal distances.

7. The zoom lens system of claim 1, wherein the movable frame is rotatable, and the selection lens groups and the storage space are positioned on a common circle centered on a rotation center of the movable frame.

8. The zoom lens system of claim 7, wherein the movable frame rotates with respect to a shaft that is parallel to the optical axis.

9. A zoom lens system comprising:
    a plurality of lens groups that are movable along an optical axis; and
    a plurality of selection lens groups that are selectively positioned on the optical axis,
    wherein one of the selection lens groups is selectively positioned on the optical axis to select any one of a plurality of optical systems, and when the plurality of lens groups are moved to be close to each other along the optical axis for storage, all of the selection lens groups are positioned outside the optical axis to secure a storage portion for the plurality of lens groups.

10. The zoom lens system of claim 9, wherein the selection lens groups comprise a first selection lens group having a wide-angle function and a second selection lens group having a high magnification zoom function.

11. The zoom lens system of claim 9, wherein the selection lens groups comprise a first selection lens group and a second selection lens group, wherein the first and second selection lens groups have different focal distances.

* * * * *